Figure 1:
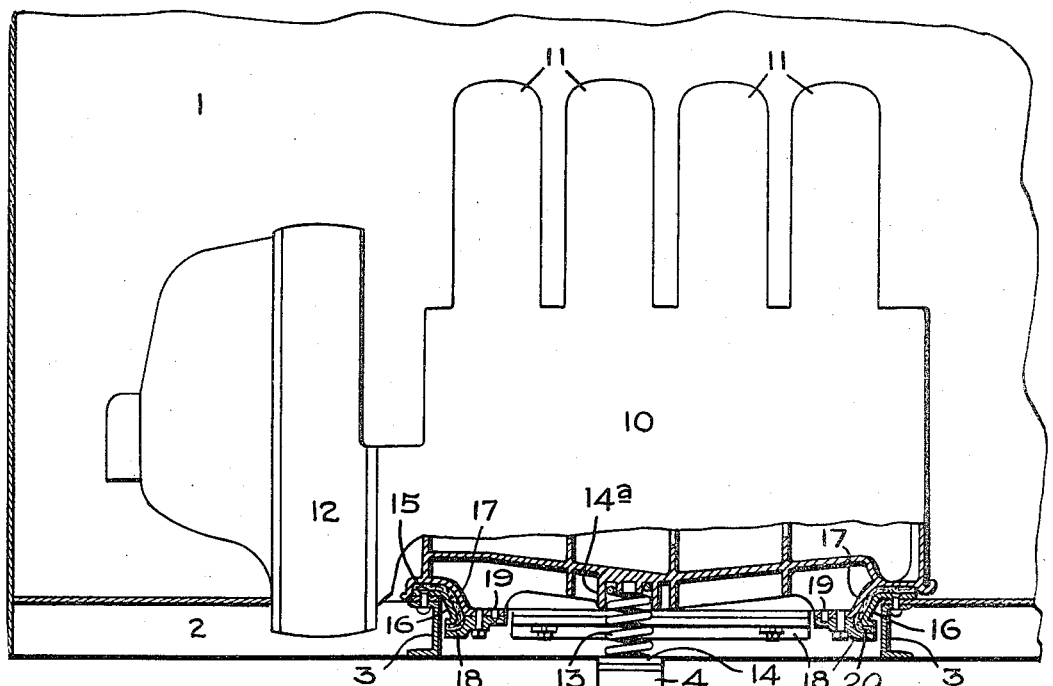

H. G. CHATAIN.
MEANS FOR SUPPORTING ENGINES.
APPLICATION FILED APR. 23, 1912.

1,080,748.

Patented Dec. 9, 1913.

Witnesses:

Inventor:
Henri G. Chatain,
by
Att'y.

UNITED STATES PATENT OFFICE.

HENRI G. CHATAIN, OF ERIE, PENNSYLVANIA, ASSIGNOR TO GENERAL ELECTRIC COMPANY, A CORPORATION OF NEW YORK.

MEANS FOR SUPPORTING ENGINES.

1,080,748.  Specification of Letters Patent.  Patented Dec. 9, 1913.

Application filed April 23, 1912. Serial No. 692,534.

*To all whom it may concern:*

Be it known that I, HENRI G. CHATAIN, a citizen of the United States, residing at Erie, county of Erie, State of Pennsylvania, have invented certain new and useful Improvements in Means for Supporting Engines, of which the following is a specification.

The present invention relates to self-propelled vehicles, and in particular to the class of vehicles adapted to run on metal rails and in which the motive power is supplied by an internal combustion engine mounted in the vehicle, which is direct connected to an electric generator, the latter supplying current to electric motors mounted on the vehicle axles.

If the engine and generator are fastened directly on the floor sills of the car or vehicle, the vibrations of the engine will be transmitted directly thereto to the annoyance and discomfort of the passengers. This vibration is more noticeable at some speeds than at others.

The object of my invention is to provide a suspension or support for the engine and generator which will prevent the transmission of vibrations to the car body, and at the same time securely anchor the engine and generator against fore-and-aft, sidewise and lifting movements relative to said body. To this end, I mount the engine and generator within the vehicle on a spring means suitably selected to prevent the transmission of engine vibrations to the body, which means is located under the engine and preferably under the center of gravity of the whole mass, said spring means being supported by the body bolster or other suitable part. In addition to this, the engine and generator are supported by one or more cushions, which, in addition to acting as a weight supporting means and preventing the transmission of engine vibrations, assist in preventing rocking or lurching and pitching movements of any substantial amplitude. This cushion can, with advantage, be made of a thick dense felt of ordinary manufacture, and either in a single piece or in a number of pieces. I have discovered that such felt is entirely satisfactory for the purpose, providing it is not compressed to too high a degree. My experiments, extending over a considerable period of time, under actual operating conditions show that such felt can sustain a load of about ten pounds per square inch as a maximum, and this for an indefinite time, without injurious effects. If the compression of the felt is too low, the movements of the engine and generator relative to the car body will be of too great a magnitude. On the other hand, if the compression is too great, the vibrations of the engine will be transmitted through it to the car body to a greater or less extent. I have found felt to be a satisfactory material for these cushions, but I do not wish to limit myself to it, as other more or less resilient and equivalent materials may be employed. The spring means may be adjustably mounted on the bolster or other part of the body, or shims may be placed under said means to change the lifting effect thereof. By changing the stress exerted by the spring, the proportion of the total weight carried by the cushion or cushions can readily be fixed.

Owing to the yielding nature of the support, means must be provided to anchor the engine and generator against fore-and-aft, sidewise and lifting movements. For this purpose, I may advantageously employ means such as clamps which are of suitable section to engage the portions of the sills of the car body located directly beneath the engine, said clamps extending above, below and on one side of each of said sills. In order to prevent these clamps from transmitting engine vibrations to the car body, cushioning means, such as felt, are interposed between the clamps and the sills, which means are also placed under low compression.

Owing to the fact that the engine and generator, in addition to being direct connected for driving purposes, have their casings or fixed parts bolted together, they may be treated as a unitary structure. From one point of view, my invention is therefore directed to an engine support, and from another point of view to an engine-generator support.

Figure 2:
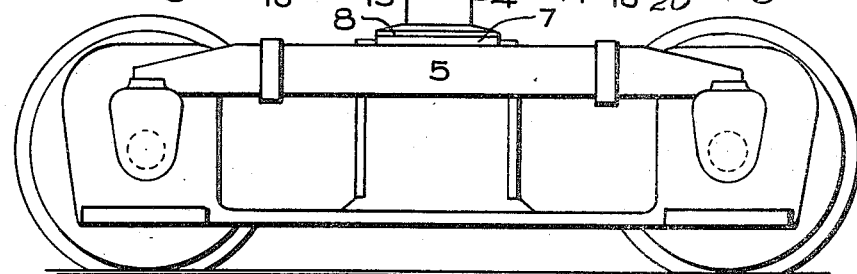
Figure 3:
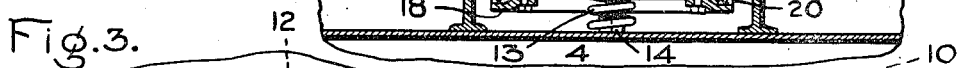

In the accompanying drawing, which illustrates one of the embodiments of my invention, Figure 1 is a view partly in section and partly in side elevation of the front end of a motor car; Fig. 2 is a detail sectional view taken in a plane perpendicular to that of Fig. 1, and Fig. 3 is an inverted plan view showing a means for anchoring the engine.

1 indicates a cab located at the front end of a motor car, said car being provided with longitudinal sills 2 and transverse sills or braces 3. Located below the sill is a body bolster 4, which is supported by a truck 5, which may be of any suitable construction. The truck is provided with a bolster 7, and between the body and truck bolsters is a pivot 8 to permit the truck to turn under the car body. The truck itself may be of any suitable construction and provided with springs of suitable character.

10 indicates a multi-cylinder internal combustion engine. In the present instance, the engine is provided with eight cylinders 11 arranged in sets of four each, although the number can be varied if desired. Bolted to the engine frame is the casing 12 of an electric generator of any suitable construction.

Located under the center of gravity of the mass of the engine and generator is a coiled compression spring 13 that rests in a socket member 14 on the body bolster and enters a socket 14ª formed on the underside of the engine frame, said spring being suitably constructed and arranged to prevent engine vibrations from being transmitted to the bolster and vehicle body. This spring sustains a portion of the weight of the engine and generator, the balance being sustained by one or more horizontally disposed cushions 15 that are located under the sides and ends of the engine. These cushions are made of felt and are under relatively low compression. The cushions rest on smooth surfaced plates 16, which are fastened by rivets to the sills of the car body.

In order to prevent fore-and-aft, sidewise and lifting movements of the engine, clamps or anchoring devices are provided. These devices are formed of flanged portions 17 that are or may be cast integral with the base of the engine. To these flanges are bolted detachable pieces 18 that extend under the lower ends of the plates 16 to limit the lifting movement of the engine. This same construction is employed on the sides as well as on the front and rear ends of the engine. The side pieces 18 are considerably longer than those extending across the front and rear ends of the engine and are held in place by two or more bolts. Each of the end pieces is held in place by a single clamping bolt, and a pin 19 is provided to prevent said piece from twisting on the bolt. Between each of the clamps and the plate 16 is a cushion 20 which prevents the transmission of engine vibrations to the sills of the car body. These cushions are also made of felt and are under relatively low compression. For convenience, the cushion that assists in supporting the weight of the engine and that between the parts of the anchor and the sills is made in one piece, which is bent over the plate 16, as shown in Figs. 1 and 2. The cushions can, however, be made in separate pieces if desired.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, an engine, coiled spring means for sustaining a large part of the weight of the engine, a cushion for the engine extending along its sides and ends and supporting a part of the weight thereof, a support which carries the means and cushion, and anchoring means for securing the engine to the support.

2. In combination, an engine, a coiled spring that is located under the center of gravity of the engine for supporting it, a support upon which the spring is mounted, anchoring means for securing the engine to its support, and cushions between the support and anchoring means that are under low compression.

3. In combination, an engine, coiled spring means located under the engine for sustaining the weight thereof and preventing the transmission of engine vibrations, a support for the spring means, and anchoring means at the sides and ends of the engine to limit the fore-and-aft, sidewise and lifting movements thereof with respect to the support.

4. In combination, an engine, a spring means located under the engine for sustaining the weight thereof, a support for the spring means, anchoring means to limit the fore-and-aft, sidewise and lifting movements of the engine with respect to the support, and a cushion which carries a certain portion of the weight of the engine and is itself carried by the support.

5. In combination, an engine, coiled spring means located under the engine for sustaining a large part of the weight thereof, a support for the spring means, anchoring means at the sides and ends of the engine to limit the fore-and-aft, sidewise and lifting movements thereof with respect to the support, and a resilient means located between the anchoring means and the support carrying a part of the weight of the engine to prevent the transmission of engine vibrations from one to the other.

6. In combination, an engine, a spring means located under the engine for sustaining a part of the weight thereof, a cushion for sustaining the remainder of said weight, which is under a relatively low compression, a support upon which the means and cushion are mounted, anchors for the engine that cooperate with the support, and cushion means interposed between the anchors and the support.

7. In combination, an engine, a spring located under the center of gravity of the engine for sustaining a part of the weight thereof, a body of felt that sustains the balance of the weight of the engine, sills for supporting the engine, and anchors for the engine which engage the sills.

8. In combination, a vehicle frame comprising sills and a body bolster, an engine, and a spring that is seated on the bolster for supporting the engine.

9. In combination, a vehicle frame comprising sills and a body bolster, an engine, a spring that is seated on the bolster for supporting the engine, and a cushion that is located between the engine and the sills to carry a portion of the weight of the engine and prevent the transmission of vibrations from one to the other.

10. In combination, a vehicle frame comprising sills and a body bolster, an engine, a spring that is seated on the bolster for supporting the engine, an anchoring means to restrict the fore-and-aft, sidewise and lifting movements of the engine, and cushion means that support a part of the weight of the engine and are interposed between the anchoring means and the sills to absorb vibration.

In witness whereof, I have hereunto set my hand this 19th day of April, 1912.

HENRI G. CHATAIN.

Witnesses:
ALEX. F. MACDONALD,
S. J. SMITNEY.